United States Patent
Oeschger et al.

(10) Patent No.: US 10,220,551 B2
(45) Date of Patent: Mar. 5, 2019

(54) THERMALLY INSULATED CORRUGATED CONDUIT

(71) Applicant: Brugg Rohr AG Holding, Brugg (CH)

(72) Inventors: Alfred Oeschger, Wil (CH); Roberto Rudi, Schinznach-Dorf (CH)

(73) Assignee: BRUGG ROHR AG HOLDING, Brugg (CH)

( * ) Notice: Subject to any disclaimer, the term of this patent is extended or adjusted under 35 U.S.C. 154(b) by 202 days.

(21) Appl. No.: 14/772,808

(22) PCT Filed: Feb. 26, 2014

(86) PCT No.: PCT/CH2014/000025
§ 371 (c)(1),
(2) Date: Sep. 4, 2015

(87) PCT Pub. No.: WO2014/134745
PCT Pub. Date: Sep. 12, 2014

(65) Prior Publication Data
US 2016/0018047 A1    Jan. 21, 2016

(30) Foreign Application Priority Data
Mar. 6, 2013 (CH) ........................................ 551/13

(51) Int. Cl.
*B29C 44/30* (2006.01)
*B29C 44/32* (2006.01)
(Continued)

(52) U.S. Cl.
CPC .......... *B29C 44/306* (2013.01); *B29C 44/324* (2013.01); *B29C 44/328* (2013.01);
(Continued)

(58) Field of Classification Search
CPC ... B29C 44/306; B29C 44/324; B29C 44/328; B29C 44/56; B29C 59/143; B29K 2075/00; F16L 59/143; F16L 59/153
(Continued)

(56) References Cited

U.S. PATENT DOCUMENTS 5,492,151 A * 2/1996 Wood ...................... F16L 11/111
138/121
6,056,018 A * 5/2000 Renaud .................. F16L 11/111
138/121
(Continued)

FOREIGN PATENT DOCUMENTS

| CN | 1177537 A | 4/1998 |
|----|-----------|--------|
| CN | 101761708 A | 6/2010 |

(Continued)

OTHER PUBLICATIONS

Chinese Search Report corresponding to CN201480021082.6 dated May 30, 2016.
(Continued)

*Primary Examiner* — Craig M Schneider
*Assistant Examiner* — David R Deal
(74) *Attorney, Agent, or Firm* — McCormick, Paulding & Huber LLP

(57) ABSTRACT

The invention relates to a corrugated, thermally insulated conduit for fluids, e.g. for district heating networks, wherein at least one medium pipe (2) made of plastic or metal is surrounded by a thermal insulation layer (14), consisting of a polyurethane foam for example. The corrugation (25, 26) of the outer jacket (15) made of plastic is formed such that both the corrugation valleys (25) and the corrugation peaks (26) are round, particularly circular. In addition, the corrugation is dimensioned such that the corrugation depth T lies in a range of 4.5 mm to 8 mm for a conduit outer diameter (Continued)

range of 63 mm to 202 mm. This shaping and dimensioning of the conduit results in very good flexibility and thus the ability to roll up the pipe for the transport thereof.

16 Claims, 2 Drawing Sheets

(51) Int. Cl.
    *F16L 59/14*     (2006.01)
    *F16L 59/153*     (2006.01)
    *B29C 44/56*     (2006.01)
    *B29L 23/00*     (2006.01)
    *B29K 75/00*     (2006.01)

(52) U.S. Cl.
    CPC ............ *B29C 44/56* (2013.01); *F16L 59/143* (2013.01); *F16L 59/153* (2013.01); *B29K 2075/00* (2013.01); *B29K 2995/0094* (2013.01); *B29L 2023/225* (2013.01)

(58) Field of Classification Search
    USPC ................ 138/149, 140, 137, 173, 121, 122
    See application file for complete search history.

(56) References Cited

U.S. PATENT DOCUMENTS

| | | | |
|---|---|---|---|
| 6,279,614 B1* | 8/2001 | Riesselmann | B32B 1/08 |
| | | | 138/137 |
| 7,478,652 B2* | 1/2009 | Sakazaki | F16L 11/11 |
| | | | 138/121 |
| 2004/0256018 A1* | 12/2004 | Ikemoto | B29D 23/001 |
| | | | 138/126 |
| 2005/0092383 A1* | 5/2005 | Cheng | F16L 11/11 |
| | | | 138/121 |
| 2007/0227758 A1* | 10/2007 | Rudi | B29C 44/1242 |
| | | | 174/110 F |
| 2008/0245434 A1* | 10/2008 | Hibino | F16L 11/112 |
| | | | 138/121 |
| 2011/0308659 A1* | 12/2011 | Oeschger | B29C 44/324 |
| | | | 138/149 |
| 2012/0067452 A1* | 3/2012 | Briand | F16L 11/1185 |
| | | | 141/1 |

FOREIGN PATENT DOCUMENTS

| | | |
|---|---|---|
| CN | 202674603 U | 1/2013 |
| DE | 2127646 A | 1/1973 |
| DE | 3635515 A1 | 4/1988 |
| DE | 10021523 A1 | 11/2001 |
| DE | 20315754 U1 | 12/2003 |
| EP | 0892207 A2 | 1/1999 |
| EP | 0897788 A1 | 2/1999 |
| GB | 1370679 | 10/1974 |
| GB | 2195163 A | 3/1988 |
| JP | 2002005348 A | 1/2002 |
| WO | 2010085906 A1 | 8/2010 |

OTHER PUBLICATIONS

International search report for PCT/CH2014/000025 dated May 9, 2014.

* cited by examiner

THERMALLY INSULATED CORRUGATED CONDUIT

CROSS REFERENCE TO RELATED APPLICATIONS

This application is entitled to the benefit of and incorporates by reference essential subject matter disclosed in International Patent Application No. PCT/CH2014/000025 filed on Feb. 26, 2014 and Swiss Patent Application No. 551/13 filed on Mar. 6, 2013, the contents of which are hereby incorporated by reference into this application.

FIELD OF THE INVENTION

The invention relates to a thermally-insulated, corrugated conduit having at least one inner service pipe made of plastic or metal, a plastic insulation layer surrounding the service pipe and a plastic outer housing wherein the corrugation extends into the insulating layer. The invention further relates to a method for producing such a thermally-insulated, corrugated conduit.

BACKGROUND OF THE INVENTION

EP 0 897 788 A1 describes a method for forming a corrugated and thermally-insulated conduit. Conduits of the aforementioned type prepared by this method have proven their worth. A further improvement of the method is known from WO 2010/085906, in which a deeper corrugation can be achieved, whereby a conduit having a corrugation is explicitly shown, which has a U-shaped groove in the outer housing and the insulating layer, respectively, between straight running segments. The corrugation depth is 4 mm to 10 mm and a better flexibility of the conduit can be achieved. The good flexibility of a conduit makes it possible to roll-up a greater delivery length onto a conduit feed roll, which is advantageous for the logistics expenses. Moreover, the effort may be lower during the installation.

SUMMARY OF THE INVENTION

The object of the invention is to provide a thermally-insulated, corrugated conduit having improved properties.

This object is achieved in that the troughs and peaks of the corrugation have a round cross-sectional shape, and that with an outer diameter of the conduit in the range of 63 mm to 202 mm the corrugation depth ranges from 4.5 mm to 8 mm.

It shows that with the claimed shaping and dimensioning an outer housing having particularly good uniformity of the outer housing thickness is achievable, so that the same material thickness of the outer housing exists to the greatest extent in the troughs and peaks. This results in an absence of adverse accumulations of material in the troughs. It further shows that a significantly improved flexibility may also be achieved with conduits having commercially available outer diameters in the range of 63 mm to 202 mm. It is especially preferred if the troughs and peaks as seen in cross-section are each formed from one part of a circle and thereby each trough or peak has a circular shape, wherein the circular parts are connected by a substantially straight section. The combination of the corrugation depth ranging from 4.5 mm to 8 mm and the round shape, results, depending on the conduit diameter, in an approx. 20% to 60% increased flexibility during bending of the conduit compared to a pipe with a smooth casing, which can yield 20% to 40% longer quantities delivered per rolled-up transport unit. This lowers the logistics expenses and the increased flexibility of the conduit simplifies handling thereof.

Preferably, the conduit is designed so that the outer diameter D of the conduit is in the range from 63 mm to 90 mm, the corrugation depth T ranges from 4 mm to 5 mm, in particular, and that the corrugation depth T is 4.5 mm. It is further preferred that for an outer diameter D of the conduit in the range of 90 mm to 202 mm the corrugation depth is in the range of 5 mm to 8 mm. It shows that such an adjustment of the corrugation depth to the outer diameter of the conduit provides the mentioned advantages particularly well.

Further it is preferable if the radius of curvature of circular troughs or peaks is selected such that the radius of curvature of the trough RT is greater than the radius of curvature of the peak RB. This results in an especially good flexibility and homogeneity of the thickness of the outer housing. Particularly preferred ranges for the radii of curvature for varying diameters of the conduit are explained hereinafter.

In addition, there are preferred ranges for the distance W between adjacent troughs, which likewise positively influence the flexibility and the uniformity of the thickness of the outer housing. Also for this purpose, preferred ranges dependent upon the outer diameter range of the conduit are disclosed hereinafter.

It shows, as noted, that in the production of the conduit with use of the aforementioned shaping and/or parameters, a very homogeneous distribution of the outer housing material results along the corrugation, providing material savings. The preferred production method for the corrugated conduit includes steps wherein the service pipe (2) is first foam-covered with the thermal insulation (14) to form a blank (10), whereupon the outer housing (15) is placed around the blank (10) formed by the foam-covered service pipe and wherein in the forming of the thermal insulation the troughs (25) and peaks (26) of the corrugation seen in cross-section are produced with round cross-sectional shape, and wherein with an outer diameter of the service pipe of 63 mm to 202 mm, the corrugation depth T is produced in the range of 4.5 mm to 8 mm.

Also in this way, the mentioned preferred ranges for the corrugation depth and/or the radius of curvature and/or the distance of the peaks, as mentioned for the conduit are used to obtain the stated advantages.

BRIEF DESCRIPTION OF THE DRAWINGS

Further embodiments, advantages and uses of the devices and method are apparent from the dependent claims and the following description of exemplary embodiments based on the Figures wherein:

DESCRIPTION OF THE PREFERRED EMBODIMENTS

Figure 1:
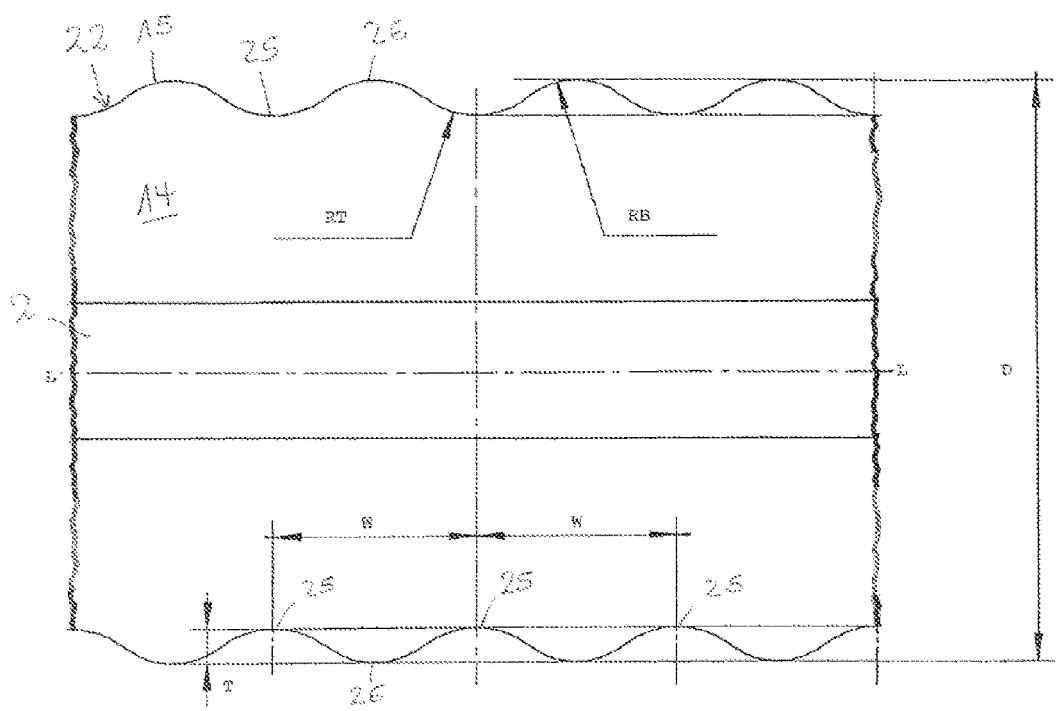
FIG. 1 shows a cross-section through the central longitudinal axis of a conduit according to the invention.

FIG. 1 shows a sectional view of a conduit 22 as a cross-section through the central longitudinal axis L of the conduit, wherein only a short section of the entire conduit 22 is depicted. However, this is implemented along its length, as explained by reference to the section. If in the following a cross-section is being discussed, then such a cross-sectional view through the central longitudinal axis L according to FIG. 1 is meant, which makes apparent the shape of the corrugation of the conduit and its internal structure. However, the individual layers or pipes are not represented true to scale or simplified for the drawing.

The conduit 22 in this exemplary embodiment of the invention has a single inner service pipe 2, through which the medium or fluid to be transported flows when the conduit is employed. Several service pipes may also be present. Service pipe 2 may be formed from plastic, i.e. polyethylene, or made of metal. The pipe can be either smooth or corrugated. The service pipe 2 is surrounded by a thermal-insulating layer 14, which is preferably formed from a polyurethane foam. It is subsequently explained by reference to FIG. 2 how the foam-casing of the medium pipe can be carried out. Preferably, the thermal insulating layer is formed from a hard polyurethane foam with a density of 45 kg/m$^3$ to 80 kg/m$^3$. The outer housing 15 of the conduit 22 is shown in the drawing for simplification thereof only as a line, but is a plastic material several millimeters thick, in particular with a thickness ranging from 2 mm to 5 mm. The material of the outer housing is also a plastic, in particular polyethylene, PE, for example PE-LD having a density of 915 kg/m$^3$ to 935 kg/m$^3$. Other types of PE or other plastics may also be used.

The conduit 22 according to the invention is a corrugated conduit, wherein both the outer housing 15 and the thermal insulation 14 comprise the corrugation. These two parts of the conduit are fixed in direct contact and the outer housing 15 is continuously adjoined to the thermal insulation. This is achieved particularly with the production method explained with the help of FIG. 2.

The corrugation is illustrated with the troughs 25 and peaks 26, which are visible in the cross-section of FIG. 1. The two elements of the corrugated shape are formed round according to the invention. Preferably, both the trough 25 and the peak 26 seen in the cross-section are circular or these elements of the corrugation are each part of a circle. Accordingly, a radius RT can be specified for the trough and a radius RB for the peak. More preferably, the radius of the trough is greater than the radius of the peak, thus the relation RT>RB applies. The peaks and troughs are preferably connected by sections of the corrugation which are substantially straight in path.

The corrugation depth T, thus the difference between the top point of the peak 26 and the lowest point of the trough 25 according to the invention, is in the range of 4.5 mm to 8 mm with an outer diameter D (measured from the peaks) ranging from 63 mm to 202 mm. It has proven to be advantageous that with this shaping and dimensioning in the production method described in the following for the conduit, a very homogeneous thickness of the outer housing results, while other shapes and dimensions may give rise to a variable thickness in the longitudinal direction of the corrugation. This is undesirable, since then the outer housing must be chosen as generally thicker, in order to also still have adequate thickness at the thinnest sites, while then an unnecessary excess of material is present at the thickest sites. The corrugation-shaping and depth of corrugation according to the invention thus make possible as a positive effect an outer housing, which has a more even thickness and thus a savings in outer housing material. It further shows that these characteristics which bring about the uniform thickness of the outer housing also provide an improved bending capacity of the conduit 22.

Preferably, with an outer diameter D of the conduit 22 in the range of 63 nm to 90 mm, the corrugation depth T is implemented in the range of 4 mm to 5 mm. Preferably, the corrugation depth T is 4.5 mm.

Preferably, with an outer diameter D of the conduit 22 in the range of 90 nm to 202 mm, the corrugation depth T is implemented in the range of 5 mm to 8 mm. Preferably, the corrugation depth T is 5.5 mm.

Furthermore, there is a preferred range for the distance W of the lowest point of two consecutive troughs 25, which gives particularly good results in the effects of the homogeneous outer housing and good bending properties. This distance W preferably ranges from 25 mm to 50 mm.

Preferably, with an outer diameter D of the conduit in the range of 63 mm to 90 mm, the distance W of two consecutive troughs is in the range of 25 mm to 33 mm and in particular in the range from 25 mm to 27 mm.

It is further preferred that with an outer diameter D of the conduit in the range of 90 mm to 202 mm, the distance W of the lowest point of two adjacent troughs is in the range of 35 mm to 50 mm and more particularly is in the range of 33 mm to 40 mm and more particularly in the range of 33 mm to 35 mm. This proves that the preferred ranges yield a good result for the bending properties and homogeneity of the conduit.

Figure 2:
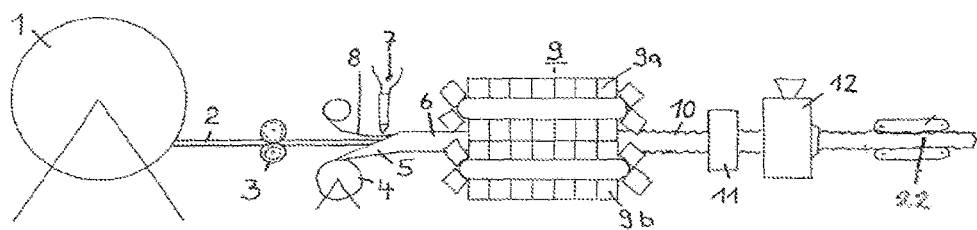
FIG. 2 schematically shows a unit for implementing the method for producing the conduit.

FIG. 2 shows a production of the conduit 22, as is disclosed in the outlines of EP 0 897 788 A1. Here, a service pipe or internal pipe 2 is withdrawn continuously from the feed drum 1. The means for withdrawing or conveying in the production direction are not shown, since such means are known to those skilled in the art. The service pipe 2 can be a plastic or metal pipe and may be smooth or corrugated. In particular a service pipe 2 made from crosslinked polyethylene is used. The service pipe 2 can be passed through a caliber roller pair 3, the rollers being driven. The caliber roller pair 3 is preferably displaceable in two directions perpendicular to each other transverse to the direction of production or withdrawal. As mentioned above, two or more service pipes may be present in the conduit and would accordingly feed two or more inner pipes 2 jointly to the further steps.

A plastic film 5, in particular a polyethylene film, is peeled-off from a supply reel 4 and placed concentrically around the service pipe 2 to form a pipe 6 having a glued or welded longitudinal seam. The plastic film 5 may also be a multi-layer film. A foaming plastics mixture can be introduced into the open pipe 6, in particular based on polyurethane or polyethylene, for example by means of the nozzle 7. The closed pipe 6 is inserted into a molding tool 9, which is composed of a plurality of mold halves 9a and 9b, which together form a "migrating die" for the service pipe equipped with the insulating layer and films 5 and/or 6. Film 5 thus forms the outermost layer of the service pipe.

The surfaces of the mold halves 9a and 9b facing the film 5 or film 6 have the previously explained corrugation profile, in which the film 5, 6 is formed as a result of the foam pressure. The pipe blank 10 emerging from the molding tool 9 thus has a corrugated surface with the required corrugation as explained above.

The pipe blank 10 can then pass through a known X-ray device 11, by means of which the pipe blank 10 is continuously checked for an exact central position of the service pipe 2 or a correct position of several service pipes 2 within the insulating layer 14.

In the next production step, the outer housing 15 of the conduit made of plastic is extruded onto the pipe blank 10 by means of an extruder. A vacuum is thereby generated in a known manner, which brings about the close fitting of the outer housing on the foamed insulating layer or on films 5, 6 of the pipe blank 10. The outer housing 10 is fitted closely to the corrugation of the pipe blank 10, whereby the conduit receives the required shaping and dimensioning. The outer housing glues to the plastic films 5, 6 due to high temperatures received during extrusion thereof, so that the outer housing adjoins without breaks and/or directly to the thermal insulation. The finished conduit 22 having shaping and dimensioning according to the invention can then be withdrawn by a driven extractor and reeled up onto a transport roller.

The invention claimed is:

1. A thermally-insulated, corrugated conduit (22) comprising at least one inner service pipe (2) made from plastic or metal, wherein a thermal-insulating layer (14) made of plastic surrounds the service pipe (2) and an outer housing (15) made of plastic surrounds the thermal-insulating layer (14), wherein corrugations (25, 26) circumscribing the conduit (22) are formed in the outer housing and extend into the thermal insulation layer (14), characterized in that troughs (25) and peaks (26) of the corrugations have a round cross-sectional shape with an outer diameter of the conduit in the range of 63 mm to 202 mm, and a corrugation depth T in the range of 4.5 mm to 8 mm,
   wherein the round cross-sectional shape of the troughs (25) and peaks (26) in each case is part of a circle,
   wherein the troughs (25) and peaks (26) are connected by substantially straight sections of the corrugations, each straight section extending between stations spaced longitudinally along the length of the conduit (22), and
   wherein the radius of curvature RT of the troughs (25) is greater than the radius of curvature RB of the peaks (26).

2. A conduit according to claim 1, characterized by an outer diameter D of the conduit (22) in the range of 63 mm to 90 mm, and the corrugation depth T in the range of 4 mm to 5 mm.

3. A conduit according to claim 1, characterized by an outer diameter D of the conduit (22) in the range of 90 mm to 202 mm, and the corrugation depth T in the range of 5 mm to 8 mm.

4. A conduit according to claim 1, characterized by an outer diameter D of the conduit (22) in the range of 63 mm to 90 mm, the radius of curvature RT of the troughs (25) in the range of 10 mm to 11 mm, and the radius of curvature RB of the peaks in the range of 9 mm to 10 mm.

5. A conduit according to claim 1, characterized by an outer diameter D of the conduit (22) in the range of greater than 90 mm up to 202 mm, the radius of curvature RT of the troughs (25) in the range of greater than 15 mm up to 18 mm, and the radius of curvature RB of the peaks (26) in the range of greater than 13 mm up to 15 mm.

6. A conduit according to claim 1, characterized in that a distance W of the lowest point of two adjacent troughs (25) is in the range of 25 mm to 50 mm.

7. A conduit according to claim 6, characterized by an outer diameter D of the conduit (22) in the range of 63 mm to 90 mm, and the distance W of the lowest point of two adjacent troughs (25) in the range of 25 mm to 33 mm.

8. A conduit according to claim 6, characterized by an outer diameter D of the conduit (22) in the range of greater than 90 mm up to 202 mm, and the distance W of the lowest point of two adjacent troughs (25) in the range of greater than 33 mm up to 50 mm.

9. A conduit according to claim 1, characterized in that the thermal insulation layer (14) is formed from a rigid polyurethane foam having a density of 45 kg/m$^3$ to 80 kg/m$^3$.

10. A method for producing a thermally-insulated, corrugated conduit (22) according to claim 1, comprising at least an inner service pipe (2), a corrugated outer housing (15) made of plastic arranged at a distance therefrom and a thermal insulation (14) made from foamed plastic filling out the space between service pipe (2) and outer housing, wherein the service pipe (2) is first foam-covered with the thermal insulation (14) to form a blank (10), whereupon the outer housing (15) is placed around the blank (10) formed by the foam-covered service pipe and wherein corrugations completely circumscribing the conduit are produced in the outer housing and extend into the thermal insulation with troughs (25) and peaks (26) of the corrugations seen in cross-section being produced with round cross-sectional shape, and wherein with an outer diameter of the service pipe of 63 mm to 202 mm, the corrugation depth T is produced in the range of 4.5 mm to 8 mm, and further wherein,
   the round cross-sectional shape of the troughs (25) and peaks (26) in each case is produced as part of a circle,
   the troughs (25) and peaks (26) of the corrugation are connected by substantially straight sections extending between stations spaced longitudinally along the conduit (22), and
   the radius of curvature RT of the troughs (25) is greater than the radius of curvature RB of the peaks (26).

11. A method according to claim 10, characterized in that an outer diameter D of the conduit (22) is in the range of 63 mm to 90 mm, the radius of curvature RT of the troughs (25) is produced in the range of greater than 10 mm up to 11 mm, and the radius RB of the peaks (26) is produced in the range of greater than 9 mm up to 10 mm.

12. A method according to claim 10, characterized in that an outer diameter D of the conduit (22) is in the range of greater than 90 mm up to 202 mm, the radius of curvature RT of the troughs (25) is produced in the range of greater than 15 mm up to 18 mm, and the radius of curvature RB of the peaks (26) is produced in the range of greater than 13 mm up to 15 mm.

13. A method according to claim 10, characterized in that a distance W of the lowest point of two adjacent troughs (25) is produced in the range of 25 mm to 50 mm.

14. A method according to claim 13, characterized in that an outer diameter D of the conduit (22) is in the range of 63 mm to 90 mm, and the distance W of the lowest point of two adjacent troughs (25) is produced in the range of 25 mm to 33 mm.

15. A method according to claim 13, characterized in that an outer diameter D of the conduit (22) is in the range of greater than 90 mm up to 202 mm, and the distance W of the lowest point of two adjacent troughs (25) is produced in the range of greater than 33 mm up to 50 mm.

16. A thermally-insulated, corrugated conduit (22) comprising at least one inner service pipe (2) made from plastic or metal, wherein a thermal-insulating layer (14) made of plastic surrounds the service pipe (2) and an outer housing (15) made of plastic surrounds the thermal-insulating layer (14), wherein corrugations (25, 26) of the conduit (22) circumscribe the conduit and extend into the thermal insulation layer (14), characterized in that troughs (25) and peaks (26) of the corrugations are formed in the housing and have a round cross-sectional shape, an outer surface of the thermal-insulating layer (14) has round cross-sectional peaks mating with the corrugations of the housing, with an outer diameter of the conduit in the range of 63 mm to 202 mm, and a corrugation depth T in the range of 4.5 mm to 8 mm, wherein the troughs (25) and peaks (26) are connected by substantially straight sections extending between spaced locations along the length of the conduit (22), wherein the round cross-sectional shape of the troughs (25) and peaks (26) in each case is part of a circle, and wherein the radius of curvature RT of the troughs (25) is greater than the radius of curvature RB of the peaks (26).

\* \* \* \* \*